(12) United States Patent
Muller et al.

(10) Patent No.: US 12,035,701 B2
(45) Date of Patent: Jul. 16, 2024

(54) BAIT STATIONS FOR BITING FLIES IN BLOOD-SEEKING MODE AND METHODS THEREIN

(71) Applicant: WTO Investments, LLC, Dallas, TX (US)

(72) Inventors: Gunter Muller, Haifa (IL); Onie Tsabari, Tel Aviv (IL)

(73) Assignee: WTO INVESTMENTS, LLC, Dallas, TX (US)

(*) Notice: Subject to any disclaimer, the term of this patent is extended or adjusted under 35 U.S.C. 154(b) by 415 days.

(21) Appl. No.: 16/490,577

(22) PCT Filed: Mar. 7, 2018

(86) PCT No.: PCT/US2018/021247
§ 371 (c)(1),
(2) Date: Sep. 2, 2019

(87) PCT Pub. No.: WO2018/165227
PCT Pub. Date: Sep. 13, 2018

(65) Prior Publication Data
US 2020/0015470 A1 Jan. 16, 2020

(30) Foreign Application Priority Data
Mar. 10, 2017 (OA) .............................. 1201700092

(51) Int. Cl.
*A01M 1/02* (2006.01)
*A01N 25/00* (2006.01)
*A01M 1/10* (2006.01)

(52) U.S. Cl.
CPC ........... *A01M 1/023* (2013.01); *A01N 25/006* (2013.01); *A01M 1/106* (2013.01)

(58) Field of Classification Search
CPC .......... A01M 1/00; A01M 1/02; A01M 1/023; A01M 1/106; A01N 25/006
(Continued)

(56) References Cited

U.S. PATENT DOCUMENTS

| 4,850,305 | A | * | 7/1989 | Georgi | ................. | A01K 67/033 |
| | | | | | | 119/6.6 |
| 5,238,681 | A | * | 8/1993 | Chang | ................. | A01N 25/006 |
| | | | | | | 424/405 |

(Continued)

OTHER PUBLICATIONS

Brian Rohrig, Animal Survival in Extreme Temperatures, Oct. 2013, American Chemical Society, Webpage, https://www.acs.org/content/acs/en/education/resources/highschool/chemmatters/past-issues/archive-2013-2014/animal-survival-in-extreme-temperatures.html (Year: 2013).*

*Primary Examiner* — Brady W Frazier
(74) *Attorney, Agent, or Firm* — Reuven K. Mouallem; FlashPoint IP Ltd.

(57) ABSTRACT

The present invention discloses devices for a durable insect bait station for biting flies in blood-seeking mode and methods therein. The devices include: an elastomeric membrane for providing access to the bait station, the elastomeric membrane adapted to be permeable to volatile components, and the elastomeric membrane configured to allow easy insect-probe penetration for biting flies in blood-seeking mode; a bait core for providing bait to the bait station, the bait core including: at least one blood-feeding stimulant (BFS) for inducing feeding of the biting flies on the bait core; and at least one insect toxin; wherein the bait core is configured to be substantially in direct contact with the elastomeric membrane; and a support element for attaching the elastomeric membrane and the bait core to a fixed (Continued)

Exemplary Embodiment structure. Alternatively, the BFS for inducing the feeding is operative at an ambient temperature below an average mammal temperature.

24 Claims, 1 Drawing Sheet

(58) Field of Classification Search
USPC .......................................................... 43/107
See application file for complete search history.

(56) References Cited

U.S. PATENT DOCUMENTS

| | | | |
|---|---|---|---|
| 5,685,109 A * | 11/1997 | Rimback ............. | A01M 1/2005 43/107 |
| 6,601,337 B1 * | 8/2003 | McKenney, Sr. ....... | A01M 1/02 43/132.1 |
| 6,718,689 B1 * | 4/2004 | Kolibas ............... | A01M 1/2005 43/131 |
| 6,978,572 B1 * | 12/2005 | Bernklau .............. | A01M 1/023 43/107 |
| 7,694,455 B1 * | 4/2010 | Bowden ................ | A01M 1/106 43/107 |
| 8,266,839 B2 * | 9/2012 | Bernard ............... | A01M 1/2011 43/131 |
| 8,420,070 B2 * | 4/2013 | Simchoni-Barak ..... | A01M 1/08 424/84 |
| 9,089,122 B2 * | 7/2015 | Olson ................... | A01M 1/023 |
| 9,220,255 B2 * | 12/2015 | Halahmi ............. | A01M 1/2005 |
| 10,765,100 B2 * | 9/2020 | Schlein ................ | A01M 1/106 |
| 2007/0269404 A1 * | 11/2007 | Simchoni-Barak .... | A01N 37/44 424/410 |
| 2009/0260276 A1 * | 10/2009 | Kirsch ................. | A01M 1/026 43/114 |
| 2010/0024278 A1 * | 2/2010 | Simchoni-Barak ... | A01M 1/023 43/113 |
| 2010/0229459 A1 * | 9/2010 | Simchoni-Barak .... | A01N 31/02 43/112 |
| 2012/0124890 A1 * | 5/2012 | Hainze ................. | A01M 1/026 43/121 |

* cited by examiner

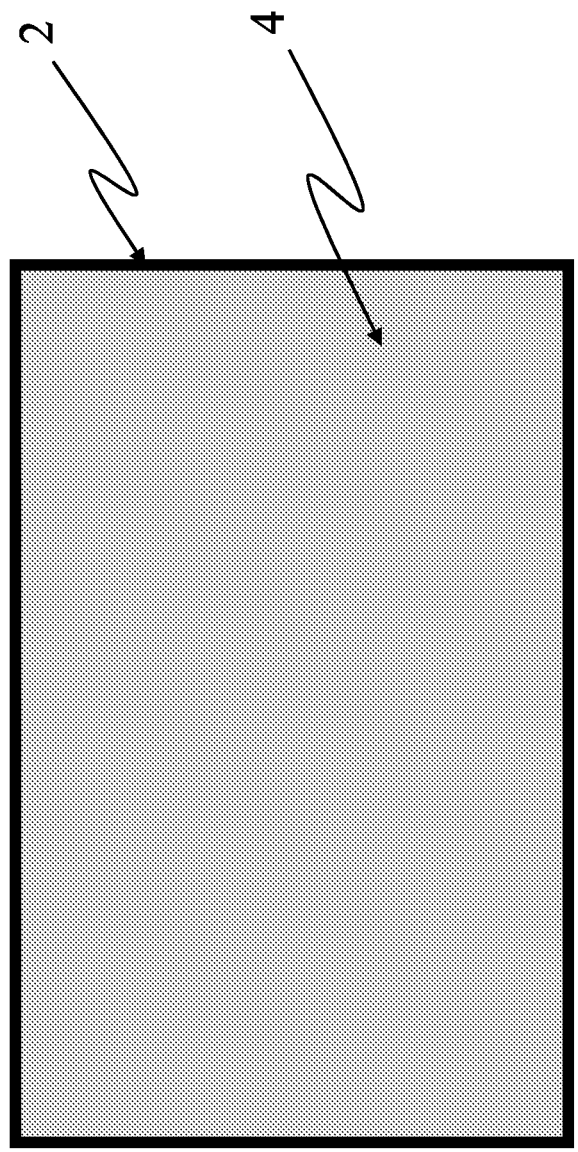

BAIT STATIONS FOR BITING FLIES IN BLOOD-SEEKING MODE AND METHODS THEREIN

FIELD AND BACKGROUND OF THE INVENTION

The present invention relates to bait stations for biting flies in blood-seeking mode (particularly mosquitoes of the genera *Aedes, Culex*, and *Anopheles*; sand flies; and biting midges) and methods therein.

Biting flies are known for their blood-feeding behavior, which makes them vectors of pathogens. However, while female biting flies predominantly need blood for egg production, and sugar as their main source of energy, most male biting flies do not feed on blood, and are completely dependent on sugar.

Currently, bait stations are one of the most interesting and promising insect control techniques. A bait station is a device that is installed in a way that the targeted insects can feed on the bait, either outdoors or indoors.

Typical prior-art bait is a viscous substance or aqueous-gel mixture having an attractant, a substance that the insect uses as food (e.g., sugar or a carbohydrate solution), and a toxin (e.g., boric acid, spinosad, and dinotefuran). The bait formulation may further include preservatives and colorants. Such lures attract insects to feed on the bait, while the toxin enters the insect body during feeding (either by ingestion or contact), causing its death.

The references of Foster (1995 and 1997, see full reference in Literature section below for which all references therein are hereby incorporated by reference in their entirety) support the existence of a bimodal behavior for such biting flies with regard to foraging activity—that is, blood foraging versus sugar foraging. Specifically, it is understood that such biting flies have a different behavioral response to sensory cues when foraging for blood hosts versus sugar sources.

As stated by Christophers in 1960, sugar feeding is "not associated with the violent impulses and zest that characterize desire for blood." Yuval (1992) states:

"Sugar feeding is an opportunistic, non-random, circadian activity undertaken by most mosquitoes to satisfy their energy requirements. Its expression is species specific, molded by the environment in which each species evolved and modulated by hierarchical interactions with other physiological and behavioral processes. Better knowledge of the mechanisms which govern expression of this activity may be useful in controlling vectors of disease."

It has been shown that generalizations can be made across various species of blood-sucking flies that are sugar-feeding, indicative of predictability in the art with regard to this aspect. A hierarchy of attraction cues has been shown which agrees largely with the model presented by Bradbury and Bennett (1974), emphasizing the role of visual cues in close-range attraction.

However, as stated by Yuval, the "hierarchical interactions with other physiological and behavioral processes" may indicate that the mode of foraging (blood vs. sugar) also may shift the relative importance of such cues. Yuval refers to the model proposed by Roitberg and Friend (1992) on "A General Theory for Host Seeking Decisions in Mosquitoes." Roitberg and Friend state:

"Nectar and blood hosts are both initially located on the basis of their odours (e.g. Vargo and Foster, 1982). Once within close range, visual cues may be used as well. Upon landing on a host, different search tactics are employed as a consequence of differences in location. Nectar is generally concentrated at a single source (e.g. flower nectary) whereas blood is much more evenly distributed throughout the host."

The requirement for sugar-feeding influences longevity, fecundity, dispersal, host-seeking behavior, and ultimately blood-feeding that facilitates disease transmission, as known in the art (see Literature section). Biting flies do not find sugar sources randomly; they rather search for sugar sources actively by following olfactory cues.

This dependence on sugar of biting flies was only recently exploited for control measurements. In recent times, attractive, toxic, sugar baits were developed to attract and kill biting flies in the field. These baits basically include an attractive component, sugar as a feeding stimulant, and an oral toxin. Currently, bait stations are one of the most interesting and promising insect control techniques.

In the prior art, U.S. Pat. No. 8,420,070 (with common inventors and ownership to the present invention, and is hereby incorporated by reference in their entirety) teaches methods for controlling insects by providing an insect bait adapted to attract the insects, and to effect the insects to feed on the insect bait, mediated by an olfactory-cue-based attractant, in which the insect bait lacks an active visual-cue element for a biting-fly sugar-source-foraging behavior-mode.

Since typical prior-art bait is a viscous substance or aqueous-gel mixture as mentioned above, a major drawback of prior-art bait technologies is the sensitivity to outdoor environments, such as sunlight, dust, rain, dew, and cold flow due to gravity. Cold flow of bait causes loss of material and uneven distribution along the dimensions of the bait. Baits having no outer, protective film tend to accumulate dust that sticks to the bait, while the sunlight's radiation (particularly in the UV range) can cause severe degradation over a period of time of outdoor exposure.

U.S. Pat. No. 9,220,255 (with common ownership to the present invention, and is hereby incorporated by reference in their entirety) teaches bait stations having elastomeric membranes for providing access to the bait stations in which the membranes are adapted to be permeable to volatile components, and configured to allow easy insect-probe penetration for mosquitoes and other biting flies, and configured to be resistant to degradation caused by ultraviolet (UV) exposure. The bait stations include a bait core for providing bait to the bait station in which the bait core includes a sugar-source bait.

In prior-art studies (see Literature section) in the absence of a suitable attractant, a non-attracting, toxic sugar solution was initially sprayed on flowering plants. Mosquitoes were attracted by the scent of the flowers, and fed on the sugar solution, consequently resulting in death. While effective in controlling mosquitoes, this method required bait application to be dependent on locating suitable flowering plants. Furthermore, the impact on "non-target" flower-visiting insects such as bees and other pollinators was very high.

Fermenting the fruit with wine or beer for a few days mitigated this limitation. The resulting attractants proved to be highly effective for the control of flies; however, the same attractants exhibited poor long-term stability in field studies, as well as poor shelf life for a commercializable product. Furthermore, the availability of over-ripe fruit in industrial quantities with a persistent quality, and the standardization of the fermentation process posed additional problems. In addition, fermented fruit and their extracted products attracted not only biting flies, but also non-target insects in some areas such as non-biting Diptera, Hymenoptera, and Lepidoptera.

WO Patent Publication No. 2015/114619 (with common inventors and ownership to the present invention, and is hereby incorporated by reference in their entirety) recites methods for selectively attracting biting flies using bait stations having a date-derived syrup product, while discriminately not attracting non-target insects.

While such advances in the state of the art have ushered in greater effectiveness, efficiency, control, suitability, longevity, and selectivity for technical solutions in mitigating insect populations, the above technologies focus on biting flies while exclusively in their sugar-foraging mode, as opposed to blood-foraging or blood-seeking mode. Moreover, biting-fly populations are becoming harder to control due to acquired resistance from frequent exposure to commonly-used contact insect toxins.

It would be desirable to have bait stations for biting flies in blood-seeking mode and methods therein. Such bait stations and methods would, inter alia, overcome the limitations mentioned above.

SUMMARY

It is the purpose of the present invention to provide bait stations for biting flies in blood-seeking mode (particularly mosquitoes of the genera *Aedes, Culex,* and *Anopheles*; sand flies; and biting midges) and methods therein.

It is noted that the term "exemplary" is used herein to refer to examples of embodiments and/or implementations, and is not meant to necessarily convey a more-desirable use-case. Similarly, the terms "alternative" and "alternatively" are used herein to refer to an example out of an assortment of contemplated embodiments and/or implementations, and is not meant to necessarily convey a more-desirable use-case. Therefore, it is understood from the above that "exemplary" and "alternative" may be applied herein to multiple embodiments and/or implementations. Various combinations of such alternative and/or exemplary embodiments are also contemplated herein.

The use of blood or artificial blood (i.e., blood substitutes or surrogates) in laboratory environments for feeding experimental biting flies has been shown to require that the blood meal always be heated to about 37-38° C. in order to induce feeding.

Currently, there is no evidence nor suggestion that biting flies can be induced to feed at all at temperatures below about 37° C. Rather, numerous published studies have shown (see Literature section and references therein) that efficient feeding of blood meals to test specimens in laboratory settings for conducting experimental research and other controlled studies on biting flies require such a minimum threshold temperature to be met. Otherwise, as temperatures falls below this critical threshold, feeding abruptly drops to virtually zero. It is presumed that the heating of the blood meal is required in order to better simulate the host environment for feeding on real blood hosts, as opposed to simulated hosts.

Embodiments of the present invention surprisingly enable the use of various Blood-Feeding Stimulants (BFSs) to induce blood-feeding flies to feed on the bait core of a durable insect bait station (serving as a simulated host) when such insects are in blood-seeking mode in which the BFS is operative at an ambient temperature below an average mammal temperature. With regard to BFSs, blood-feeding insects can be classified into three groups.

1. Insects responding to adenosine nucleotides—adenosine triphosphate (ATP) or diphosphate (ADP), depending on the genus (e.g., maximal response of the *Culex* genus is to ADP, while maximal response of the *Aedes* genus is for ATP).
2. Insects responding to the tonicity of the solutions—the sandfly *Lutzomyia longipalpis* and species of the *Anopheles* genus (*An. freeborni, An. stephensi,* and *An. gambiae*) will feed on isotonic solutions supplemented with sodium bicarbonate ($NaHCO_3$) or albumin, respectively.
3. Insects responding in an intermediate fashion from the other two groups above—such insects (e.g., the flea *Xenopsylla cheopis*) respond to tonicity, but also require ATP or ADP for a full feeding response.

Some embodiments of the present invention employ various Blood-Feeding Lures (BFLs) to attract or lure blood-feeding insects to the bait station when such insects are in blood-seeking mode. The BFLs utilized include:
carbon dioxide—a universal activator/orientator for all blood-feeding insects,
lactic acid—an activating and orientating stimulus for some mosquitoes, especially if carbon dioxide is also present in the airstream, and
octenol, acetone, ammonia, butanone, fatty acids (e.g., hexanoic acid), indole, 6-methyl-5-hepten-2-one, and phenolic components of urine.

In practice, BFLs having short-chain molecules are preferred. While biting flies generally prefer longer-chain molecules (particularly with fatty acids), long-chain molecules tend to be unstable and decompose quickly, making such BFL compounds impractical for use in durable bait stations.

Some embodiments of the present invention employ various netting components (e.g., a bed net, an aperture-screen housing, a screen, and a mesh). The use of bed nets and long-lasting insecticide-treated nets (LLINs) has been employed as an effective way to prevent malaria. LLINs provide a double effect, working as a physical barrier preventing the mosquitoes from reaching their prey (i.e., the host), but also as a chemical barrier, with the insecticide repelling the mosquitoes, or killing them when the mosquitoes enter into contact with the net.

Embodiments of the present invention provide highly-effective means for killing blood-questing resistant mosquitoes and biting flies. Consequently, such embodiments can be considered a major tool for ameliorating public health. Moreover, by especially targeting resistant mosquitoes and biting flies, such embodiments can be regarded as a unique tool for preventing the propagation of existing resistance, and avoiding the development of new resistances to contact toxins. Such embodiments serve as a "host replacement" for biting flies. Furthermore, such embodiments enable a large array of agricultural pesticides, gut toxins to be employed, which otherwise cannot be utilized for adult mosquito/biting fly control.

Therefore, according to the present invention, there is provided for the first time a device for a durable insect bait station for biting flies in blood-seeking mode, the device including: (a) an elastomeric membrane for providing access to the bait station, the elastomeric membrane adapted to be permeable to volatile components, and the elastomeric membrane configured to allow easy insect-probe penetration for biting flies in blood-seeking mode; (b) a bait core for providing bait to the bait station, the bait core including: (i) at least one blood-feeding stimulant (BFS) for inducing feeding of the biting flies on the bait core; and (ii) at least one insect toxin; wherein the bait core is configured to be substantially in direct contact with the elastomeric membrane; and (c) a support element for attaching the elastomeric membrane and the bait core to a fixed structure.

Alternatively, the elastomeric membrane: (i) has a thickness of less than 100 microns and a hardness of less than 60 Shore A; (ii) is configured to be resistant to degradation caused by ultraviolet (UV) exposure; and/or (iii) is composed of at least one elastomeric material selected from the group consisting of: polydimethyl siloxanes (PDMS) polymers, silicone rubber, hydrogenated block styrene-ethylene butylenes (SEBS), and block styrene isoprene (SIBS).

Alternatively, the bait core is free of any whole blood-source agent.

Alternatively, the bait core is free of any sugar-source agent.

Alternatively, the bait core is adapted to elicit an extended contact time of the biting flies with the elastomeric membrane and/or the bait core.

Most alternatively, the extended contact time is greater than double the contact time of the biting flies in the absence of the bait core.

Alternatively, the BFS for inducing the feeding is operative at an ambient temperature below an average mammal temperature.

Alternatively, the BFS for inducing the feeding is operative at an ambient temperature below 37° C.

Alternatively, the BFS for inducing the feeding is operative on at least one biting-fly type selected from the group consisting of: mosquitoes of the genera *Aedes, Culex*, and *Anopheles*; sand flies; and biting midges.

Alternatively, the BFS is at least one component selected from the group consisting of: adenosine triphosphate (ATP) and adenosine diphosphate (ADP).

Alternatively, the insect toxin includes an oral, gut insect toxin.

Alternatively, the bait core is free of any contact insect toxin.

Alternatively, the insect toxin is selected from the group consisting of: dinotefuran, a chemical toxin, a biological toxin, a bacterial agent, a fungal agent, and an entomopathogenic agent.

Alternatively, the oral insect gut toxin includes at least one carrier agent selected from the group consisting of: sodium chloride (NaCl), sodium bicarbonate ($NaHCO_3$), a water-retaining agent, and a gel.

Alternatively, the fixed structure is a netting component configured to act as a barrier to prevent the biting flies from penetrating the netting.

Most alternatively, the netting component includes at least one component selected from the group consisting of: a bed net, an aperture-screen housing, a screen component, and a mesh component.

Alternatively, the support element includes at least one component selected from the group consisting of: an adhesive material, a fibrous material, a strap, a hook, a connector, a magnet, and a mounting hole.

Alternatively, the bait core further includes: (iii) at least one blood-feeding lure (BFL).

More alternatively, the BFL includes at least one component selected from the group consisting of: carbon dioxide, lactic acid, octenol, acetone, ammonia, butanone, fatty acids, hexanoic acid, indole, 6-methyl-5-hepten-2-one, and a phenolic component of urine.

More alternatively, the BFL is operative to create a BFL-rich gaseous environment in the vicinity of the bait core.

Most alternatively, the BFL-rich gaseous environment is present in the vicinity of the fixed structure.

Alternatively, the device further includes: (d) an optical target for the biting flies.

Most alternatively, the optical target has a dark external appearance relative to the fixed structure.

According to the present invention, there is provided for the first time a method for providing a durable insect bait station for biting flies in blood-seeking mode, the method including the steps of: (a) providing an elastomeric membrane for access to the bait station, wherein the elastomeric membrane is adapted to be permeable to volatile components, and wherein the elastomeric membrane is configured to allow easy insect-probe penetration for biting flies in blood-seeking mode; (b) formulating a bait core for providing bait to the bait station, wherein the bait core includes: (i) at least one blood-feeding stimulant (BFS) for inducing feeding of the biting flies on the bait core; and (ii) at least one insect toxin; wherein the bait core is configured to be substantially in direct contact with the elastomeric membrane; and (c) providing a support element for attaching the elastomeric membrane and the bait core to a fixed structure.

According to the present invention, there is provided for the first time a method for providing a durable insect bait station for biting flies in blood-seeking mode, the method including the step of: (a) applying an elastomeric membrane to be substantially in direct contact with a bait core, wherein the elastomeric membrane adapted to be permeable to volatile components, and wherein the elastomeric membrane configured to allow easy insect-probe penetration for biting flies in blood-seeking mode, and wherein the bait core includes: (i) at least one blood-feeding stimulant (BFS) for inducing feeding of the biting flies on the bait core; (ii) at least one insect toxin; and (iii) a support element for attaching the elastomeric membrane and the bait core to a fixed structure.

These and further embodiments will be apparent from the detailed description and examples that follow.

BRIEF DESCRIPTION OF THE DRAWINGS

The present invention is herein described, by way of example only, with reference to the accompanying drawing, wherein:

FIG. 1 is a simplified, cross-sectional schematic diagram of a durable insect bait station having a protective membrane and a bait core, according to embodiments of the present invention.

DESCRIPTION OF THE ILLUSTRATIVE EMBODIMENTS

The present invention relates to devices for bait stations for biting flies in blood-seeking mode and methods therein. The principles and operation for providing such devices and methods, according to the present invention, may be better understood with reference to the accompanying description and the drawing. Exemplary embodiments of the present invention are detailed below in the following experimental studies and results.

Referring now to the drawing, FIG. 1 is a simplified, cross-sectional schematic diagram of a durable insect bait station having a protective membrane and a bait core, according to embodiments of the present invention. The durable insect bait station is shown having a durable, outer, protective membrane 2 that encapsulates a bait core 4.

EXPERIMENTAL STUDIES

Preliminary Cage Experiments:

Rectangular cages (1×1×1 m) made from metal frames covered with gauze, with two sleeved openings, were used to perform preliminary experiments. A simple flat substrate served as the support for the bait station (15×15 cm) having a 3:1 ratio mixture of ATP to ADP, respectively, at a concentration of 1 mM (W/V, weight to volume concentration), as a blood-feeding stimulant (BFS) for the biting flies was found to exhibit the best engorgement response comparable to whole human blood.

A concentration of 0.1% W/V of dinotefuran as a gut toxin was included in the bait-core formulation with the BFS. Finally, sodium chloride (NaCl) and sodium bicarbonate ($NaHCO_3$) at effective concentrations totaling 0.8%-1% W/V of the solutes were also included in the final formulation with a water-retaining gel. The final bait-core formulation was then covered by a directly-contacting, black, pierceable membrane.

It is noted that a range of about 0.25 mM to about 1.5 mM of both ATP and ADP at ratios ranging between about 3:1 to about 1:1, with final formulation concentrations of phosphorylated adenosines between about 0.5 mM to about 3 mM can be used. In addition, NaCl (for controlling pH) and sodium bicarbonate at effective concentrations totaling about 0.8% to about 1% of the solutes in the final formulation in order to have a bioavailable concentration in the gel that is isotonic.

Furthermore, effective concentrations of toxins vary with the toxin employed. As examples, for dinotefuran, a concentration of about 0.03% to about 0.25% can be used. For linseed oil a concentration of about 0.05% to about 0.3% can be used. For sodium dodecyl sulfate, a concentration of about 0.05% to about 0.25% can be used. Similarly, a suitably-identified concentration of boric acid or spinosad can be employed. Moreover, suitable contact toxins, without an exhibited toxin resistance (discussed below), can be used as well.

In the preliminary cage experiments, the bait stations with gut toxin killed 85.3% of the exposed female *Aedes, Anopheles*, and *Culex* trial-specimens overnight while in the cages (with more or less equal effectiveness for 10 repetitions, N: 1,000). Similar bait stations without the gut toxin resulted in only 7.1% lethality of the exposed female *Aedes, Anopheles*, and *Culex* trial-specimens being killed (with more or less equal response for 10 repetitions, N: 1,000).

Patch Experiments:

The simple bait station configuration described above in the preliminary cage experiments served as the basis for all the following experiments. The substrate, BFS/toxin bait, and membrane combination is referred to hereinafter as the "basic patch."

A series of patch experiments were conducted using basic patches having various membrane colors as the only difference between trials. The patches were tested in the rectangular cages described above. The patch colors tested black, red, blue, yellow, and white. Patches with darkly-colored membranes (i.e., black, red, and blue) attracted and killed significantly more biting flies than lightly-colored patches (i.e., yellow and white).

A series of patch experiments were conducted using black-membrane, basic patches of various sizes as the only difference between trials. Larger patches attracted and killed significantly more biting flies than smaller patches. The biting flies were indifferent to patch shape.

Release-Chamber Control Experiments:

All the following experiments were conducted in experimental chambers (4×7×3 m) used as release chambers in the insectary of the laboratories of Westham Ltd. in Israel. The environmental conditions were: a temperature of 27° C., a relative humidity of 80%, and a photoperiod of 16:8 hours (light:dark).

Within the release chambers, human volunteers remained inside a bed net overnight (18:00 to 6:00) outside the direct reach of the released insects, such volunteers served as the attracting hosts for the insects. Bed nets used for the experiments were impregnated with pyrethroids (purchased locally in Mali). Bed nets fulfill two purposes. On one hand, bed nets physically separate biting flies from a person inside the net (i.e., provide personal protection). On the other, if impregnated with a contact toxin, bed nets kill biting flies while attempting to find the blood host (i.e., provide general protection). The second aspect of the bed nets is important for public-health reasons in order to reduce the overall population of blood-questing mosquitoes and other biting flies, which carry diseases.

The released *Culex pipiens* trial-specimens used were resistant to pyrethroids in order to demonstrate a well-known fact regarding toxin resistance in biting flies. The trial-specimens were provided with ad libitum access to water and a 10% sucrose solution prior to the experiments, but without access to a blood meal (i.e., 24-hr. blood starvation period). All flies were discarded after being used in a single experiment (i.e., no repeated use of experimental flies).

To retrieve the deceased biting flies for counting after the experiments were conducted, the floor of the room was covered prior to the release of the biting flies with white cotton sheets. The morning following the experiments, the biting flies were collected at 11:00 to 12:00, and the remaining live biting flies were "knocked down" later inside the same rooms with ethyl acetate, and retrieved for counting from 13:00 to 15:00.

Toxin-Resistance Control-Study Results:

A "control patch" was used having the same characteristics as the basic patch described above in the preliminary cage experiments, except for the absence of a BFS. Using the release chambers and fly trial-specimens described above, an average daily survival rate of 78.5% of released female *Culex pipiens* trial-specimens was found for 5 overnight trials (N: 1,000). The high survival rate indicates that the resistance of the *Culex* against a contact pesticide on the bed net negates public-health effects of the bed nets.

Toxin-Resistance BFS-Study Results:

To overcome the negating effect of toxin resistance, a "BFS-infused patch" incorporated into a bait station was configured to be mounted on any type of netting component (e.g., a bed net, a window screen, an aperture-screen housing, a screen component, and a mesh component), on the opposite side in which human or animal (e.g., cattle) blood hosts are located, serve as a lure for attracting biting flies in blood-seeking mode. The bait station (either flat or three-dimensional) contained a BFS and a gut toxin within a carrier agent (e.g., a liquid gel or solid material) that can be penetrated by the proboscis of the biting flies covered with a directly-contacting, pierceable membrane.

The importance of using a gut toxin is emphasized to underscore the fact that such toxins provides a different mode of action than a contact toxin, which the biting flies can develop, or have already developed, a resistance to the effects of such contact toxins—rendering such toxin agents ineffective.

In the second toxin-resistance study, the same type of experiments as in the toxin-resistance control study was conducted, releasing same type and number of mosquitoes. However, a BFS-infused patch, having the same characteristics as the basic patch described above in the preliminary cage experiments, was used outside the bed net. In the toxin-resistance BFS study, an average daily survival rate of 38.6% of released female *Culex pipiens* trial-specimens was found for 5 overnight trials (N: 1,000)—a significantly-reduced survival rate in comparison to the toxin-resistance control study.

ambient room temperature conditions (25° C.). The BFS experiments were conducted using non-resistant biting flies and with non-impregnated bed nets.

Preparation of the biting-fly trial-specimens and their blood-meal starvation regimen was performed in an identical manner to the procedures described above. The BFS formulation and concentration used in the BFS-infused patch was identical to the procedure in the preliminary cage experiments described above. The control patch only differed from the BFS-infused patch in that the control patch lacked any BFS (i.e., no BFS present).

The BFS-infused and control patches were placed on the exterior surface of the bed net. Both patches were externally affixed to the bed net for each trial, providing the biting flies with equal opportunity to access either bait station. The bait cores (i.e., the BFS, toxin, and carrier agent) in the patches were stained with different food dye colors in order to verify whether the biting flies fed on the patches. The gut area of the biting flies could be readily observed externally to exhibit the color of the dye for a given patch, if the bait core material was ingested by the biting flies.

Experiments were conducted overnight with 10 releases of 200 female biting flies per trial (N: 2,000). Female biting flies were released inside the experimental huts with a sleeping human host under a bed net. Biting flies could not reach the sleeping subjects in order to obtain a blood meal due to the protection provided by the bed net.

BFS Experiment Results:

Results obtained from patch-feeding trials involving *Anopheles sergentii* with and without a BFS are presented in Table 1.

TABLE 1

Results obtained from patch-feeding trials involving *Anopheles sergentii* with a BFS (BFS-infused patch) and without a BFS (control patch).

| | Release trial | | | | | | | | | | |
|---|---|---|---|---|---|---|---|---|---|---|---|
| | 1 | 2 | 3 | 4 | 5 | 6 | 7 | 8 | 9 | 10 | Total |
| Release amount | 200 | 200 | 200 | 200 | 200 | 200 | 200 | 200 | 200 | 200 | 2,000 |
| Patch feeding (w/BFS) | 29 | 37 | 45 | 26 | 15 | 43 | 25 | 73 | 62 | 43 | 398 |
| Patch feeding (w/o BFS) | 3 | 2 | 12 | 4 | 7 | 9 | 10 | 19 | 27 | 11 | 104 |

It is clear from the above that the effect of toxin resistance in biting flies is significant. The same general phenomenon applies to other pyrethrum-resistant blood-feeders as well. In the remaining experiments described below, the biting-fly trial-specimens used had no toxin resistance.

BFS Experiments:

The feeding of various biting flies (Mosquitoes—*Aedes albopictus*, *Culex pipiens*, and *Anopheles sergentii*; sand flies—*Phlebotomus papatasi*; and biting midges—*Culicoides* sp.) a BFS-infused patch versus a control patch was studied in which the release chambers were maintained at Feeding rates for *Anopheles* on the BFS-infused patches were approximately 3.8 times greater in total than on the control patches without a BFS. The average contact times with the BFS-infused patches for *Anopheles* were approximately 3.5 times greater than the average contact times for the control patches, as measured by video-monitoring assessment.

Results obtained from patch-feeding trials involving *Culex pipiens* with and without a BFS are presented in Table 2.

TABLE 2

Results obtained from patch-feeding trials involving *Culex pipiens* with a BFS (BFS-infused patch) and without a BFS (control patch).

| | Release trial | | | | | | | | | | |
|---|---|---|---|---|---|---|---|---|---|---|---|
| | 1 | 2 | 3 | 4 | 5 | 6 | 7 | 8 | 9 | 10 | Total |
| Release amount | 200 | 200 | 200 | 200 | 200 | 200 | 200 | 200 | 200 | 200 | 2,000 |
| Patch feeding (w/BFS) | 15 | 81 | 65 | 72 | 49 | 41 | 66 | 38 | 75 | 40 | 542 |
| Patch feeding (w/o BFS) | 6 | 4 | 9 | 2 | 5 | 0 | 17 | 5 | 6 | 3 | 57 |

Feeding rates for *Culex* on the BFS-infused patches were approximately 9.5 times greater in total than on the control patches without a BFS. The average contact times with the BFS-infused patches for *Culex* were approximately 5.5 times greater than the average contact times for the control patches, as measured by video-monitoring assessment.

Results obtained from patch-feeding trials involving sand flies (*Phlebotomus papatasi*) with and without a BFS are presented in Table 3.

TABLE 3

Results obtained from patch-feeding trials involving sand flies with a BFS (BFS-infused patch) and without a BFS (control patch).

| | Release trial | | | | | | | | | | |
|---|---|---|---|---|---|---|---|---|---|---|---|
| | 1 | 2 | 3 | 4 | 5 | 6 | 7 | 8 | 9 | 10 | Total |
| Release amount | 200 | 200 | 200 | 200 | 200 | 200 | 200 | 200 | 200 | 200 | 2,000 |
| Patch feeding (w/BFS) | 31 | 22 | 51 | 19 | 40 | 15 | 9 | 64 | 36 | 57 | 344 |
| Patch feeding (w/o BFS) | 5 | 1 | 5 | 2 | 5 | 3 | 4 | 10 | 11 | 6 | 52 |

Feeding rates for sand flies on the BFS-infused patches were approximately 6.6 times greater in total than on the control patches without a BFS. The average contact times with the BFS-infused patches for sand flies were approximately 4.4 times greater than the average contact times for the control patches, as measured by video-monitoring assessment.

Results obtained from patch-feeding trials involving *Aedes albopictus* with and without a BFS are presented in Table 4.

TABLE 4

Results obtained from patch-feeding trials involving *Aedes albopictus* with a BFS (BFS-infused patch) and without a BFS (control patch).

| | Release trial | | | | | | | | | | |
|---|---|---|---|---|---|---|---|---|---|---|---|
| | 1 | 2 | 3 | 4 | 5 | 6 | 7 | 8 | 9 | 10 | Total |
| Release amount | 200 | 200 | 200 | 200 | 200 | 200 | 200 | 200 | 200 | 200 | 2,000 |
| Patch feeding (w/BFS) | 18 | 10 | 9 | 15 | 7 | 23 | 20 | 8 | 15 | 6 | 131 |
| Patch feeding (w/o BFS) | 2 | 1 | 0 | 2 | 1 | 5 | 3 | 5 | 4 | 1 | 24 |

Feeding rates for *Aedes* on the BFS-infused patches were approximately 5.5 times greater in total than on the control patches without a BFS. The average contact times with the BFS-infused patches for *Aedes* were approximately 4.2 times greater than the average contact times for the control patches, as measured by video-monitoring assessment.

Results obtained from patch-feeding trials involving biting midges (*Culicoides* sp.) with and without a BFS are presented in Table 5.

TABLE 5

Results obtained from patch-feeding trials involving biting midges (*Culicoides* sp.) with a BFS (BFS-infused patch) and without a BFS (control patch).

| | Release trial | | | | | | | | | | |
|---|---|---|---|---|---|---|---|---|---|---|---|
| | 1 | 2 | 3 | 4 | 5 | 6 | 7 | 8 | 9 | 10 | Total |
| Release amount | 200 | 200 | 200 | 200 | 200 | 200 | 200 | 200 | 200 | 200 | 2,000 |
| Patch feeding (w/BFS) | 17 | 5 | 4 | 6 | 10 | 11 | 10 | 24 | 8 | 15 | 110 |
| Patch feeding (w/o BFS) | 3 | 0 | 1 | 0 | 2 | 2 | 0 | 0 | 1 | 0 | 24 |

Feeding rates for biting midges on the BFS-infused patches were approximately 4.6 times greater in total than on the control patches without a BFS. The average contact times with the BFS-infused patches for biting midges were approximately 3.9 times greater than the average contact times for the control patches, as measured by video-monitoring assessment.

Surprisingly, in all the above BFS experiments, the biting flies were induced to feed from the bait stations in the presence of the BFS without the need to have the temperature of the bait core be at the temperature of an average mammal in order to simulate a real host.

BFL Experiments:

The addition of a Blood-Feeding Lure (BFL) to attract or lure blood-feeding flies to the bait station when such flies are in blood-seeking mode was also investigated. It was observed in general that BFLs only achieve their full potential as chemical attractants when employed in combination with $CO_2$, which can be provided by human subjects, animal subjects, or other $CO_2$ other sources.

Lactic acid, for example, is significantly more effective in stimulating host-seeking biting flies when $CO_2$ is also present for *Aedes aegypti*. Because $CO_2$ induces and maintains flight, biting flies may be reluctant to terminate flight and land under such conditions, particularly in the absence of other odors.

The luring effect is further enhanced by the addition of a dark external appearance to the patch used (relative to the surrounding structure). In the studies conducted, a black patch was compared to a white patch as the optical target, with a white bed net serving as the surrounding structure.

A systematic functional analysis for biting flies across the conventional odorant receptor repertoire indicates that each odorant receptor manifests a distinct odor-response profile and tuning breadth. The large diversity of tuning responses ranges from odorant receptors that are responsive to a single or small number of odorants ("specialists") to more broadly-tuned receptors ("generalists").

The additive effects of the various BFLs and optical targets can be understood as being part of a cascade response behavior to guide the blood-foraging of the biting flies toward the bait station. Input from a single specific odor (i.e., an odor specialist), such as $CO_2$, is adequate to induce a response behavior for biting-fly orientation. In this context, the $CO_2$ receptor can be considered a "labeled line." The input from several such odor specialists (e.g., receptors for lactic acid, $CO_2$, and temperature, and possibly, receptors for as-yet-unidentified host odors) is necessary to evoke the complete response behavior leading the biting fly to the location and identification of an intact host. Such insights need to be carefully considered when using a bait station as a simulated host for biting flies in blood-seeking mode.

Patch Placement Experiments:

A pair of thermoreceptor units at the tip of the antennae of various biting flies (e.g., the sensilla coeloconica on *Aedes aegypti*) exhibit a strong temperature sensitivity. Such pairs typically have one receptor that is warm-sensitive, responding with a phasic-tonic increase in spike frequency to sudden increases in temperature. The second thermoreceptor is typically cold-sensitive, responding with a phasic-tonic increase in spike activity to sudden decreases in temperature.

In a series of experiments, the optimum location on a bed net to mount a patch was investigated. Maximum phasic sensitivity is observed in response to temperature changes of $\pm 0.2°$ C., but the thermoreceptors can respond to changes as low as $0.05°$ C.

Warm, moist convection currents emanating from a host are important host-seeking cues to biting flies in blood-seeking mode. Such convection currents have been shown to have local thermal differentials of as much as $0.05°$ C. exist at distances greater than two meters away from a host (a 2- to 3-kg rabbit was used in the studies). Such temperature changes are well within the range of detection of the thermoreceptors of the biting flies.

The mosquitoes in the studies were found to preferably feed predominantly on patches that were affixed to the upper part of the bed nets as opposed to the lower part (i.e., patches mounted 1.5 m above the ground had greater activity than 0.5 m above the ground). Sand flies were found to prefer to feed on low-mounted patches.

Two-Chamber Experiments:

In a series of experiments, survival rates of biting flies in a "two-chamber" arrangement was investigated. The two chambers were separated by a screened window. In one chamber, a human subject was located, protected by the window screen. While in the second chamber, biting flies were questing for blood meals. A BFS-infused patch was mounted on the window screen in the second chamber in the experimental trials, while a control patch was mounted on the window screen in the second chamber in control trials. Mortality of the biting flies exposed to the BFS-infused patches was significantly higher (4.5 to 12.8 times greater) than biting flies exposed to the control patches without BFS infusion.

Durable Bait Stations

Durable insect bait stations can be constructed from a substrate material that is used to support the bait core and a protective, semi-permeable, pierceable film, which encloses bait core. Suitable substrate materials and protective films assist in preventing erosion, sagging, and cold flow of the bait core as well as lowering surface tack.

Substrate materials can be mechanically-roughened materials (e.g., reinforced cardboard and plastic) as well as materials constructed to have high surface area (e.g., woven functional fabrics and meshes, open-pore foams, fibrous mats, corrugated materials, and "honeycomb" fabricated materials).

Furthermore, natural substrates can be found in the environments of the area in which one wants to utilize the attractants. For example, green vegetation and similar foliage that are non-flowering, or are utilized when they are not in their flowering phase (in order not to attract bees), are excellent substrates. Typically, such natural substrates have roughened or textured surfaces that are ideal for supporting such bait cores. In addition, such natural substrates eliminate any concern of generating any environmental waste by-product in the environment.

Protective films can be suitable polymeric materials (e.g., thermoplastics, thermosetting polymers, carbon black-filled butyl rubber, acrylic polymer, plasticized PVC, polyurethanes, neoprene, natural rubber, and butadiene rubber). Such materials may contain elastomers (e.g., polydimethyl siloxanes (PDMS), silicone rubbers, silicone elastomers, silicone gels, ethylene-vinyl acetate, ethylene-acrylic ester copolymers and terpolymers, ethylene-propylene rubber, plastomers such as ethylene-hexene and ethylene-octene copolymers, thermoplastic vulcanized rubber (TPV); hydrogenated block styrene-ethylene butylenes (SEBS); and block styrene isoprene (SIBS).

Such materials may further contain plasticizers (e.g., aliphatic polyesters) and light stabilizers (e.g., UV stabilizers), as well as other additives such as carbon black, pigments and dyes, fillers, and bactericides, fungicides, and other microbial-activity suppressants. Such protective films assist in physically supporting the bait core in order to prevent sagging and cold flow, while allowing for effusion of volatile components of the bait core.

While the present invention has been described with respect to a limited number of embodiments, it will be appreciated that many variations, modifications, and other applications of the present invention may be made.

LITERATURE

Foster, W. A., 1995. Mosquito Sugar Feeding and Reproductive Energetics. Annu. Rev. Entomol., 40:443-74.

Hancock, R. G., and Foster, W. A., 1997. Larval and adult nutrition effects on blood/nectar choice of *Culex nigripalpus* mosquitoes. Medical and Veterinary Entomology, 11:112-122.

Christophers, S. R., 1960. *Aedes aegypti* the yellow fever mosquito: its life history, bionomics and structure. Cambridge University Press, Cambridge.

Yuval, B., 1992. The Other Habit: Sugar Feeding By Mosquitoes. Bull. Soc. Vector Ecol., 17(2): 150-156.

Bradbury, W. C. & Bennett, G. F., 1974. Behavior of adult simuliidae (diptera). II. vision and olfaction in near-orientation and landing. Can. J. Zool. 52: 1355-1364.

Roitberg, B. D., and Friend, W. G., 1992. A General Theory for Host Seeking Decisions in Mosquitoes. Bull. Math. Biol., 54(2/3): 401-412.

Vargo, A. M. and Foster, W. A., 1982. Responsiveness of Female *Aedes aegypti* (Diptera: Culicidae) to Flower Extracts. J. Med. Entomol. 19(6):710-718.

Dye, C. M., Guy, W., Elkins, D. B., Wilkes, & T. J. Killick-Kendrick, R., 1987. The life expectancy of phlebotomine sand flies: first field estimates from southern France. Med. Vet. Entomol. 1: 417-425.

Fay R. W., 1968. A Trap Based on Visual Responses of Adult Mosquitoes. Mosquito News, 28(1), 1-8.

Gibb, P. A., Anderson, J. C. & Dye, C., 1988. Are nulliparous flies light shy? Trans. R. Soc. Trop. Med. Hyg. 82: 342-343.

Killick-Kendrick, R., 1999. The biology and control of phlebotomine sand flies. Clinics in Dermatology, 17: 279-289.

MacVicker, J. A. K., Moore, J. S., Molyneux, D. H., & Maroli, M., 1990. Honeydew sugars in wild caught Italian phlebotomine sandflies (Diptera: Psychodidae) as detected by high performance liquid chromatography. Bull. Entomol. Res. 80: 339-344.

Müller, G. C. & Schlein, Y., 2004. Nectar and honeydew feeding of *Phlebotomus papatasi* in a focus of *Leishmania major* in Neot Hakikar oasis. J. Vector Ecol. 29: 154-158.

Müller, G. C. & Schlein, Y., 2006. Sugar questing mosquitoes in arid areas gather on scarce blossoms that can be used for control. Int. J. Parasitol. 36: 1077-1080.

Müller, G. C., Junnila, A., & Schlein, Y., 2010. Effective control of adult *Culex pipiens* by spraying an attractive toxic sugar bait solution in the vegetation near larval developmental sites. J. Med. Entomol. 47: 63-66.

Müller, G. C., Beier, J. C., Traore, S. F., Toure, M. B., Traore, M. M., Bah, S., Doumbia, S., & Schlein, Y., 2010a. Field experiments of *Anopheles gambiae* attraction to local fruits/seedpods and flowering plants in Mali to optimize strategies for malaria vector control in Africa using attractive toxic sugar bait methods. Malar. J., 9:262.

Müller, G. C., Beier, J. C., Traore, S. F., Toure, M. B., Traore, M. M., Bah, S., Doumbia, S., & Schlein, Y., 2010b. Successful field trial of attractive toxic sugar bait (ATSB) plant-spraying methods against malaria vectors in the *Anopheles gambiae* complex in Mali, West Africa. Malar. J., 9:210.

Schlein, Y. & Müller, G. C., 1995. Assessment of plant tissue feeding by sand flies (Diptera: Psychodidae) and mosquitoes (Diptera: Culicidae). J. Med. Entomol. 32: 882-88.

Schlein, Y. & Müller, G. C., 2008. An approach to mosquito control: Using the dominant attraction of flowering *Tamarix jordanis* trees against *Culex pipiens*. J. Med. Entomol. 45: 384-390.

Schlein, Y. & Müller, G. C., 2010. Experimental control of *Phlebotomus papatasi* by spraying attractive toxic sugar bait (ATSB) on vegetation. Trans. Trop. Med. and Hyg. 104(12):766-71.

Wallbanks, K. R., Moore, J. S., Bennet, L. R., Soren, R., Molyneux, D. H., Carlin, J. M., & Perez, J. E., 1991. Aphid derived sugars in the neotropical sandfly *Lutzomyia peruensis*. Trop. Med. Parasitol. 42: 60-62.

Bowen M. F., 1991. The Sensory Physiology of Host-Seeking Behavior in Mosquitoes. Annu. Rev. Entomol. 36:139-58.

Geier M, Bosch O J, and Boeckh J., 1999. Ammonia as an attractive component of host odor for the yellow fever mosquito, *Aedes aegypti*. Chemical Senses, 24, 647-53.

Klowden M. J., Kline, D. L., Takken W., Wood J. R., and Carlson D. A., 1990. Field studies on the potential of butanone, carbon-dioxide, honey extract, 1-octen-3-ol, L-lactic acid and phenols as attractants for mosquitos. Med Vet Entomol 4, 383-91.

Knols, B. G. J., van Loon, J. J. A., Cork, A. et al., 1997. Behavioral and electrophysiological responses of the female malaria mosquito *Anopheles gambiae* (Diptera: Culicidae) to Limburger cheese volatiles. Bull. Ent. Res., 87, 151-9.

Meijerink, J, Braks, M. A. H., Brack, A. A. et al., 2000. Identification of olfactory stimulants for *Anopheles gambiae* from human sweat samples. J. Chem. Ecol., 26, 1367-1382.

Lehane M., 2005. The biology of blood sucking in insects. Cambridge University Press, New York, US.

Awono-Ambene H. P., Diawara L., and Robert V., 2001. Comparison of direct and membrane feeding methods to infect *Anopheles arabiensis* with *Plasmodium falciparum*. Am. J. Trop. Med. Hyg. 64(1,2): 32-34.

Bonnet S., Gouagna C, Safeukui I., Meunier J. Y., and Boudin C., 1999. Comparison of artificial membrane feeding with direct skin feeding to estimate infectiousness of *Plasmodium falciparum* gametocyte carriers to mosquitoes. Trans. R. Soc. Trop. Med. Hyg. 94 (1): 103-106.

Cosgrove J. B., Wood R. J., Petric D., Evans D. T., Abbott R. H., 1994. A convenient mosquito membrane feeding system. J. Am. Mosq. Control Assoc. 10(3):434-436.

Gerberg E. J., Barnard D. R., and Ward, R. A., 1994. Manual for mosquito rearing and experimental techniques (AMCA, USA).

Rutledge L. C., Ward R. A., Gould D. J., 1964. Studies on the feeding response of mosquitoes to nutritive solutions in a new membrane feeder. Mosq. News 24(4): 407-419.

Sattabongkot J., Maneechai N., Phunkitchar V., Eikarat N., Khuntirat B., Sirichaisinthop J., Burge R., and Coleman R. E., 2003. Comparison of artificial membrane feeding with direct skin feeding to estimate the infectiousness of *Plasmodium vivax* gametocyte carriers to mosquitoes. Am. J. Trop. Med. Hyg. 69 (5): 529-535.

ffrench-Constant R. H. et al., 2007. Insecticidal toxins from *Photorhabdus* bacteria and their potential use in agriculture. Toxicon 49, 436-451.

Galun R., Koontz L. C., and Gwadz R. W., 1985. Engorgement response of anopheline mosquitoes to blood fractions and artificial solutions. Physiological Entomology 10, 145-149.

Liscia A., Crnjar R., Barbarossa I. T., Esu S., Muroni P., Galun R., 1993. Electrophysiological Responses of Labral Apical Chemoreceptors to Adenine Nucleotides in *Culex pipiens*. J. Insect Physiol., 39(3), 261-265.

Smallegange R. C., Knols B. G. J., and Takken W., 2010. Effectiveness of Synthetic Versus Natural Human Volatiles as Attractants for *Anopheles gambiae* (Diptera: Culicidae) Sensu Stricto. J. Med. Entomol. 47 (3): 338-344.

Romero A., Schal C., 2014. Blood constituents as phagostimulants for the bed bug *Cimex lectularius* L. Journal of Experimental Biology 217: 552-557.

Galun R., Oren N., Zecharia, M., 2008. Effect of plasma components on the feeding response of the mosquito *Aedes aegypti* L. Physiological Entomology. 9(4):403-408.

Smallegange R. C., Schmied W. H., van Roey K. J., Verhulst N. O., Spitzen J., Mukabana W. R., Takken W., 2010. Sugar-fermenting yeast as an organic source of carbon dioxide to attract the malaria mosquito *Anopheles gambiae*. Malar. J. 9: 292.

Murphy M. W., Dunton R. F., Perich M. J., and Rowley W. A., 2001. Attraction of *Anopheles* (Diptera: Culicidae) to Volatile Chemicals in Western Kenya. J. Med. Entomol. 38(2): 242-244.

Allan S., 2011. Susceptibility of Adult Mosquitoes to Insecticides in Aqueous Sucrose Baits. Journal of Vector Ecology 36(1): 59-67.

Pitts R. J., 2014. A blood-free protein meal supporting oogenesis in the Asian tiger mosquito, *Aedes albopictus* (Skuse). J. Insect Physiol. 64: 1-6.

Gonzales K. K. and Hansen I. A., 2016. Artificial diets for mosquitoes. Int. J. Environ. Res. Public Health 13(12): 1267.

What is claimed is:

1. A device for a durable insect bait station for biting flies in blood-seeking mode, the device comprising:
   (a) a protective membrane for providing access to the bait station, said protective membrane adapted to be permeable to volatile components, and said protective membrane configured to allow easy insect-probe penetration for biting flies in blood-seeking mode;
   (b) a bait core for providing bait to the bait station, said bait core including:
      (i) at least one blood-feeding stimulant (BFS) for inducing feeding of said biting flies on said bait core, wherein said at least one BFS is at least one component selected from the group consisting of: adenosine triphosphate (ATP) and adenosine diphosphate (ADP), and wherein said at least one BFS for inducing said feeding is operative at an ambient temperature below 37° C.; and
      (ii) at least one insect toxin;
      wherein said bait core is configured to be substantially in direct contact with said protective membrane; and
   (c) a support element for attaching said protective membrane and said bait core to a fixed structure;
   wherein the device, including said protective membrane, said bait core, said at least one BFS, said at least one insect toxin, and said support element, is devoid of any external heating element.

2. The device of claim 1, wherein said protective membrane:
   (i) has a thickness of less than 100 microns and a hardness of less than 60 Shore A;
   (ii) is configured to be resistant to degradation caused by ultraviolet (UV) exposure; and/or
   (iii) is composed of at least one polymeric material.

3. The device of claim 1, wherein said bait core is free of any whole blood-source agent.

4. The device of claim 1, wherein said bait core is free of any sugar-source agent.

5. The device of claim 1, wherein said bait core is adapted to elicit an extended contact time of said biting flies with said protective membrane and/or said bait core.

6. The device of claim 5, wherein said extended contact time is greater than double the contact time of said biting flies in the absence of said bait core.

7. The device of claim 1, wherein said at least one BFS for inducing said feeding is operative on at least one biting-fly type selected from the group consisting of: mosquitoes of the genera *Aedes, Culex*, and *Anopheles*; sand flies; and biting midges.

8. The device of claim 1, wherein said at least one insect toxin includes an oral, gut insect toxin.

9. The device of claim 1, wherein said bait core is free of any contact insect toxin.

10. The device of claim 1, wherein said at least one insect toxin is selected from the group consisting of: dinotefuran, a chemical toxin, a biological toxin, a bacterial agent, a fungal agent, and an entomopathogenic agent.

11. The device of claim 1, wherein said at least one oral insect gut toxin includes at least one carrier agent selected from the group consisting of: sodium chloride (NaCl), sodium bicarbonate (NaHCO$_3$), a water-retaining agent, and a gel.

12. The device of claim 1, wherein said fixed structure is a netting component configured to act as a barrier to prevent said biting flies from penetrating said netting.

13. The device of claim 12, wherein said netting component includes at least one component selected from the group consisting of: a bed net, an aperture-screen housing, a screen component, and a mesh component.

14. The device of claim 1, wherein said support element includes at least one component selected from the group consisting of: an adhesive material, a fibrous material, a strap, a hook, a connector, a magnet, and a mounting hole.

15. The device of claim 1, said bait core further including:
   (iii) at least one blood-feeding lure (BFL).

16. The device of claim 15, wherein said at least one BFL includes at least one component selected from the group consisting of: carbon dioxide, lactic acid, octenol, acetone, ammonia, butanone, fatty acids, hexanoic acid, indole, 6-methyl-5-hepten-2-one, and a phenolic component of urine.

17. The device of claim 15, wherein said at least one BFL is operative to create a BFL-rich gaseous environment in the vicinity of said bait core.

18. The device of claim 17, wherein said BFL-rich gaseous environment is present in the vicinity of said fixed structure.

19. The device of claim 1, the device further comprising:
   (d) an optical target for said biting flies.

20. The device of claim 19, wherein said optical target has a dark external appearance relative to said fixed structure.

21. A method for providing a durable insect bait station for biting flies in blood-seeking mode, the method comprising the steps of:
   (a) providing a protective membrane for access to the bait station, wherein said protective membrane is adapted to be permeable to volatile components, and wherein said protective membrane is configured to allow easy insect-probe penetration for biting flies in blood-seeking mode;
   (b) formulating a bait core for providing bait to the bait station, wherein said bait core includes:
      (i) at least one blood-feeding stimulant (BFS) for inducing feeding of said biting flies on said bait core, wherein said at least one BFS is at least one component selected from the group consisting of: adenosine triphosphate (ATP) and adenosine diphosphate (ADP); and
      (ii) at least one insect toxin;
      wherein said bait core is configured to be substantially in direct contact with said protective membrane;
   (c) providing a support element for attaching said protective membrane and said bait core to a fixed structure; and
   (d) inducing said feeding while maintaining said at least one BFS at an ambient temperature below 37° C. during operation.

22. A method for providing a durable insect bait station for biting flies in blood-seeking mode, the method comprising the step of:
   (a) applying a protective membrane to be substantially in direct contact with a bait core, wherein said protective membrane adapted to be permeable to volatile components, and wherein said protective membrane configured to allow easy insect-probe penetration for biting flies in blood-seeking mode, and wherein said bait core includes:
      (i) at least one blood-feeding stimulant (BFS) for inducing feeding of said biting flies on said bait core, wherein said at least one BES is at least one component selected from the group consisting of: adenosine triphosphate (ATP) and adenosine diphosphate (ADP);
      (ii) at least one insect toxin; and
      (iii) a support element for attaching said protective membrane and said bait core to a fixed structure; and
   (b) inducing said feeding while maintaining said at least one BFS at an ambient temperature below 37° C. during operation.

23. The method of claim 21, wherein the durable insect bait station, including said protective membrane, said bait core, said at least one BFS, said at least one insect toxin, and said support element, is devoid of any external heating element.

24. The method of claim 22, wherein the durable insect bait station, including said protective membrane, said bait core, said at least one BFS, said at least one insect toxin, and said support element, is devoid of any external heating element.

* * * * *